US005866186A

United States Patent [19]

Bazan

[11] Patent Number: 5,866,186

[45] Date of Patent: Feb. 2, 1999

[54] METHOD AND APPARTAUS FOR WITHDRAWING AND DILUTING FLUID IN A BAG IN A BOX CONTAINER AND FOR RINSING THE BAG

[76] Inventor: Alberto Bazan, 4347 Ridgegate Dr., Duluth, Ga. 30155

[21] Appl. No.: 658,540

[22] Filed: Jun. 5, 1996

[51] Int. Cl.[6] .............................. A23L 2/00; B08B 5/00; B08B 9/00

[52] U.S. Cl. .............................. 426/506; 15/302; 15/304; 134/21; 134/22.18; 134/22.19; 134/26; 134/169 R

[58] Field of Search .............................. 426/506; 134/21, 134/22.1, 22.12, 22.18, 22.19, 26, 168 R, 169 R; 15/302, 304, 312.1, 320; 222/106

[56] References Cited

U.S. PATENT DOCUMENTS

| | | | |
|---|---|---|---|
| 1,737,161 | 11/1929 | Jupp | 137/212 |
| 1,981,611 | 11/1934 | Cappa | 137/212 |
| 2,845,934 | 8/1958 | Payson | 134/169 R |
| 2,910,077 | 10/1959 | Blake et al. | 134/168 R |
| 3,447,558 | 6/1969 | Cserny | 137/212 |
| 4,053,284 | 10/1977 | Posch | 15/302 |
| 4,484,697 | 11/1984 | Fry, Jr. | 222/95 |
| 4,913,179 | 4/1990 | Engel et al. | 134/166 R |
| 5,117,857 | 6/1992 | Smith | 134/166 R |
| 5,582,651 | 12/1996 | Schnaars | 134/21 |

*Primary Examiner*—George Yeung
*Attorney, Agent, or Firm*—Rogers & Killeen

[57] ABSTRACT

A wand for withdrawing fluid from a bag-in-a-box container and for rinsing the bag. A method of withdrawing fluid from a bag-in-a-box container and thereafter rinsing the bag is also disclosed, as is several practical examples of use of the method.

27 Claims, 2 Drawing Sheets

METHOD AND APPARTAUS FOR WITHDRAWING AND DILUTING FLUID IN A BAG IN A BOX CONTAINER AND FOR RINSING THE BAG

BACKGROUND OF THE INVENTION

The present invention relates generally to fluid containers known generally as bag-in-a-box containers. Such containers are becoming increasingly popular and generally consist of a flexible bag which confines the fluid but which may have insufficient strength to safely contain the fluid under the stress of handling, and a surrounding box which provides structural support for the fluid filled bag as well as protection for puncture.

The disposal of such containers is enhanced over more conventional rigid wall containers in that, once emptied, the box may be collapsed for destruction or other disposition rather than returned, and the collapsed bag may be separately handled for disposition. However, disposition may be a problem where the fluid contained is environmentally unfriendly.

One disadvantage in the use of such containers in the difficulty in emptying them of their contents. Because on the nature of a fluid, the contents of the container must be withdrawn from the bottom of the container, Yet any aperture into the bottom of a container must be sealed and capable of withstanding the hydrostatic head produced by the depth of the fluid.

It is desirable to use a wand in the emptying of such containers. Wands may be coupled to flexible conduits and it is desirable to be able to successively position a plurality of containers within reach of a single permanently installed wand. Because the bag is flexible and collapses as the fluid is withdrawn therefrom, the highth of the bag will vary as fluid is withdrawn and the opening may laterally shift. This movement of the wand may adversely affect the positioning of the end of the wand relative to the container.

In one aspect, the present invention relates to a wand useful with bag-in-a-box containers, and to one which obviates most of the problems associated such the use of such containers. In another aspect, the present invention relates to methods of emptying a bag-in-a-box container and of cleaning the bag to facilitate its disposition.

It is accordingly an object of the present invention to obviate many of the known problems associated with the use of bag-in-a-box containers.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1A:
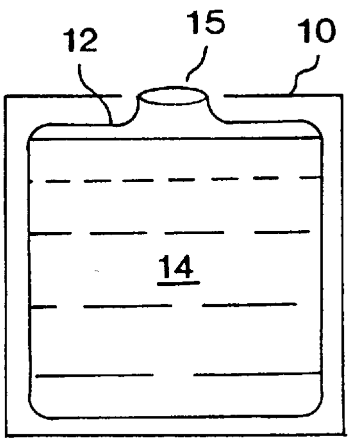
FIG. 1 (*a*) through 1 (*e*) is a series of schematic drawings illustrating one method of using the wand of the present invention.
Figure 1B:
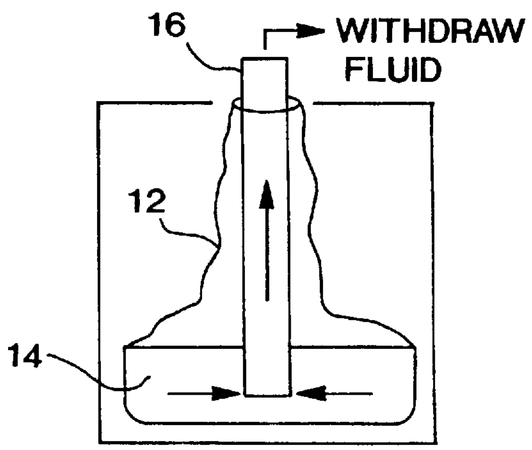
Figure 1C:
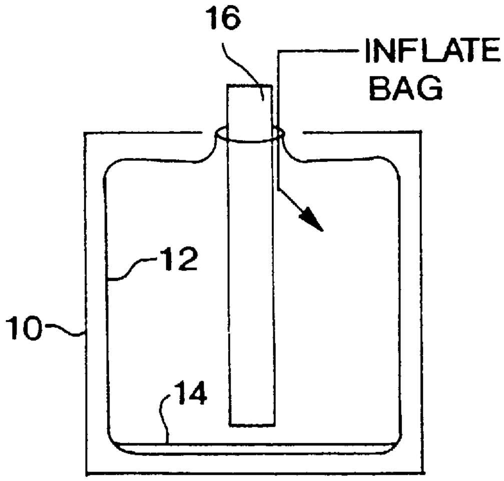
Figure 1D:
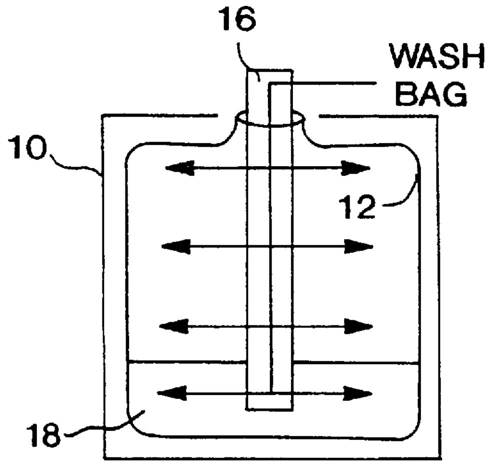
Figure 1E:
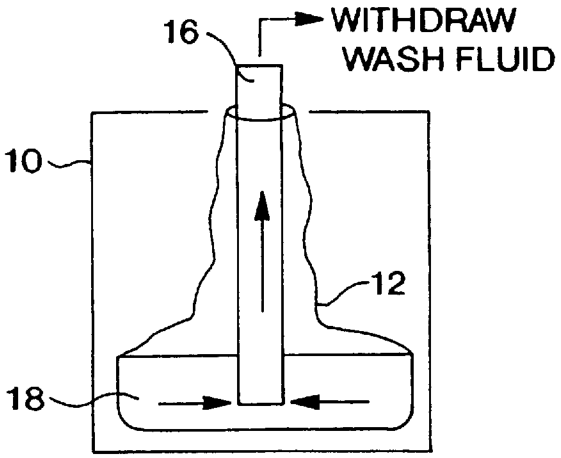

With reference to FIG. 1(*a*), a typical bag in the box container is schematically illustrated with the rigid box 10, often cardboard, encompassing a flexible bag 12, generally plastic, containing a liquid 14. A reclosable fitting 15 for the bag is accessible through an aperture in the box 10.

With the insertion of a wand 16 as illustrated in FIG. 1(*b*), the liquid 14 may be withdrawn from the bag 12 by way of the wand 16, collapsing the bag 12 above the level of the liquid 14 contained therein.

Once the liquid 14 has been withdrawn through the wand 16, the bag may be inflated as shown in FIG. 1(*c*). With the bag 12 inflated, the interior walls of the bag 12 may be cleaned by the application of a rinse liquid though the wand 16 by way of the apertures along the length thereof. As shown in FIG. 1(*d*), the liquid 18 which collects in the bottom of the bag comprises whatever liquid was not withdrawn, the liquid washed from the bag walls, and the rinse liquid.

As shown in FIG. 1(*e*), the liquid 18 may then be withdrawn through the wand again collapsing the bag above the level of the liquid 18.

Once the liquid 18 is withdrawn, the box may be opened and discarded and the collapsed bag may be separated therefrom for disposal appropriate for its original contents.

By way of example, soft drink concentrate may be shipped in bag-in-a-box containers to a bottling plant for dilution and use in the bottling of soft drinks. At the bottling plant, the wand may be inserted into the fitting in the top of the bag and the soft drink concentrate withdrawn therefrom under some combination of atmospheric or greater pressure on the upper surface of the liquid and a negative pressure or vacuum within the wand. Typically, the concentrate is delivered though a conventional piping system to a dilution tank.

The wand may then be used to rinse the walls of the bag with a diluting agent for the concentrate such as water. This may be accomplished by the inflation of the bag through the wand with a suitable gas, e.g., $CO_2$, from a source connected to the wand is any suitable conventional manner.

Once the bag is inflated to expose the interior surface of thereof, a diluting agent for the concentrate may be applied to the wand from a suitable conventional source and sprayed from apertures along the length of the wand against the interior walls of the bag. The diluted concentrate may then be removed from the bag in the same manner and delivered to the dilution tank. This rinse or wash step may be repeated several times to effect the thorough cleaning of the bag and to maximize the retrieval of the concentrate from the bag. The amount of rinse liquid may be measured for achieving the desired dilution, and/or additional diluting liquid added to complete the dilution of the concentrate within the tank.

In the case of soft drink concentrate, the concentrate is highly acidic and the return of the bag to its source or other disposal is difficult without the thorough cleaning of the bag. Thus the repeated rinse of the bags in the dilution process may significantly reduce the problem of bag disposal.

In addition, the soft drink concentrate is very expense and is highly diluted in use. The repeated rinse of the bags will maximize the recovery of the concentrate.

Figure 2:
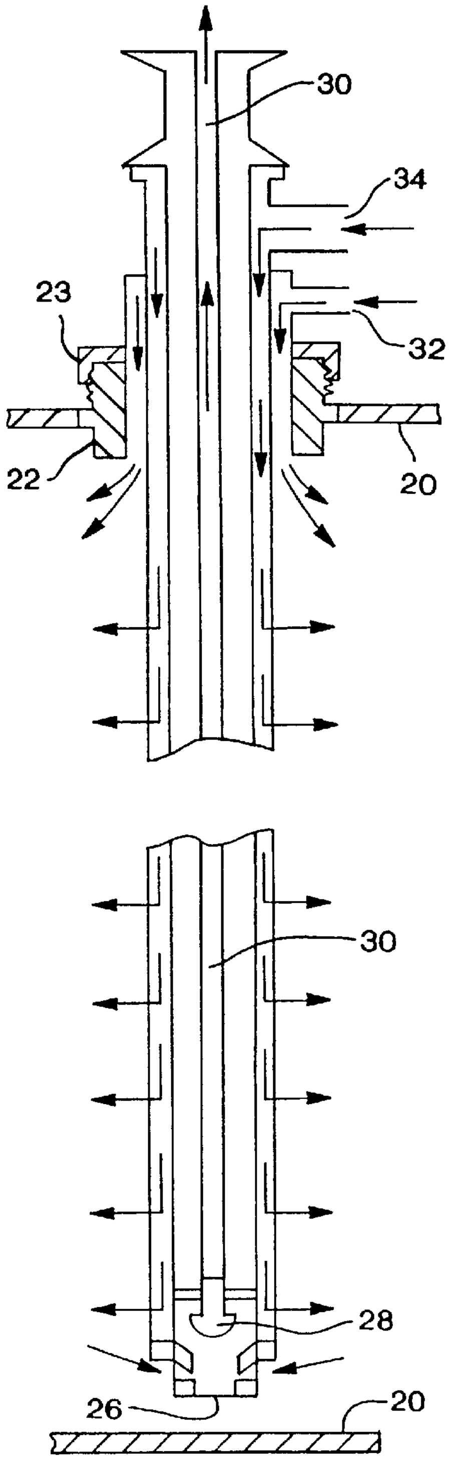
FIG. 2 is a medical section of a first embodiment of the wand of the present invention with three conduits.

One embodiment of the wand for performing the exemplary method describe above is shown in FIG. 2. With reference to FIG. 2, the bag 20 is illustrated as being attached to a suitable conventional fixture 22 defining an opening into the bag and may be provided, e.g., with a screw top cap (not shown). Removal of the cap permits the insertion of the wand into the bag and the wand may thereafter sealably attached to the fitting 22 with a suitable conventional cap 23.

As illustrated in FIG. 2, the wand is elongated and is adapted for insertion through the fixture 22 so that the lower end 26 of the wand is adjacent to the bottom of bag 20. It is desirable that the wand remain upright, and the attitude thereof may be fixed by the aperture in the box and/or some above-the-box mechanical means. The proximity of the bottom 26 of the wand to the bottom of the bag may conveniently be controlled by permitting the fitting to vertically collapse as liquid is withdrawn until contact is made with the bottom of the bag.

A suitable conventional flexible hose or other conduit may be attached to the upper end of the central passageway 30 in the wand and a suction applied thereto in the matter well known in the art. This negative pressure within the central passageway 30 may operate in a conventional manner to open a one-way valve 28 and permit liquid from the bag to be drawn into the bottom 26 of the wand and up through the central passageway 30 for removal. Once the liquid has been substantially removed from the bag, the vacuum may be released and the valve 28 permitted to close.

Since the bag 20 will have collapsed as a result of the withdrawal of the liquid therefrom, there will be may creases and folds in the bag on which the liquid may adhere or be trapped in pockets. It is desirable to inflate the bag by the introduction of a gas such as air, nitrogen, or perhaps carbon dioxide depending on the nature of the liquid removed from the bag. This gas may be introduced through a suitable conventional fitting on the passageway 32 and passed into the interior of the bag.

Once the bag 20 is inflated, the fitting on the conduit 32 may be closed, and a rinse liquid compatible with the liquid contents of the bag may be applied through a suitable conventional fitting 34 into a rinse manifold having a plurality of apertures along the length thereof. It is desirable that the positive pressure on the rinse fluid be sufficient to spray the interior walls of the bag and scour any remaining bad contents therefrom.

The rinse fluid may be any suitable diluting agent or a solvent appropriate for the liquid shipped in the bag. Spraying of the rinse liquid against the internal walls of the inflated bag will rinse the internal walls and the rinse fluid will collect in the bottom of the bag along with the liquid washed from the walls and any liquid remaining in the bottom of the bag. On completion of the rinsing process, vacuum may again be applied to the conduit 30 causing the operation of the one way valve 28 and the mixture of liquid contents and rinse liquid to be withdrawn from the bag. As earlier indicated, the rinse step may be repeated.

Figure 3:
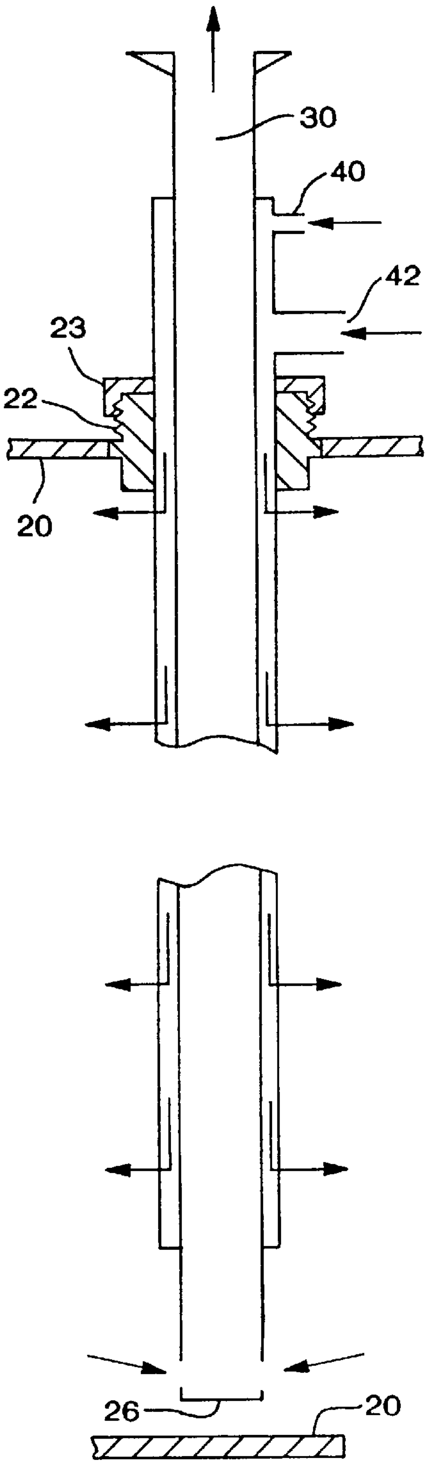
FIG. 3 is a schematic drawing in vertical section illustrating a second embodiment of the wand of the present invention with two conduits.

A second embodiment of the wand of the present invention is illustrated in FIG. 3. In contrast to the three-passageway wand of FIG. 2, the wand of FIG. 3 accomplished the same results with only two passageways. With a shared passageway, the control mechanism for the fluids applied to the wand may be more complex, but such mechanisms are well within the skill of the art.

With reference to FIG. 3 where like numerical designations have been applied to like elements in FIG. 2 to facilitate an understanding of the invention, the wand may be inserted through the fitting 22 in the bag 20 to position the lower end 26 thereof adjacent the bottom of the bag. The liquid from the bag may be withdrawn from the central conduit 30 as described in connection with the embodiment of FIG. 2 thereby collapsing the bag 20.

The bag 20 may thereafter may be inflated by the application of an appropriate gas to the conduit 40 to enter the bag through the aperture manifold. Once the bag is inflated, the fitting on the conduit 40 may be closed and a rinse fluid applied to a suitable conventional fitting on the conduit 42. In this way, both the inflating gas and the rinse fluid may be applied to the interior of the bag though the same manifold. Once the rinse step is completed, the combination of liquid contents and the rinse liquid may be withdrawn through the central conduit 30 in the manner earlier described.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of diluting a liquid beverage concentrate from a bag of a bag-in-a-box container, comprising the steps of:

(a) inserting a wand including a suction conduit, a gas conduit and a rinse manifold into a spout of the bag at the upper end of the bag to position the distal end of the wand adjacent the bottom of the bag;

(b) withdrawing a substantial portion of the liquid beverage concentrate from the bottom of the bag through the suction conduit to a dilution tank;

(c) removing the box from the bag;

(d) injecting a gas compatible with the liquid beverage concentrate into the bag through the gas conduit to inflate the bag;

(e) spraying a measured amount of an agent suitable for diluting the liquid beverage concentrate through the rinse manifold onto the interior surface of the inflated bag to wash the residual liquid beverage concentrate from the interior surface of the bag into the bottom of the bag where the agent and the residual liquid beverage concentrate mix; and (e) withdrawing the mixture from the bag through the suction conduit to the dilution tank thereby collapsing the bag and providing a relatively clean bag for safe environmental disposal.

2. A method of withdrawing a liquid from a bag of a bag-in-a-box container, comprising the steps of:

(a) inserting a wand into a spout of the bag at the upper end of the bag to position the distal end adjacent the bottom of the bag;

(b) withdrawing a substantial portion of the liquid from the bag through a suction conduit in the wand thereby collapsing the bag;

(c) injecting a gas compatible with the liquid into the bag through a gas conduit in the wand to inflate the bag;

(d) spraying a rinse compatible with the liquid through a rinse manifold in the wand onto the interior surface of the inflated bag to wash the liquid from the interior surface of the bag into the bottom of the bag; and (e) withdrawing the liquid and rinse from the bag through the suction conduit.

3. A method of withdrawing a fluid from a collapsed flexible container, comprising the steps of:

(a) applying a pressure differential between the exterior and the interior of the collapsed flexible container to inflate the container to sufficiently expose the interior surface of the flexible container, (b) spraying an agent onto the interior surface of the inflated flexible container to rinse fluid from the interior surface, and (c) applying a suction force to substantially withdraw the remaining fluid and the agent from the inflated flexible container.

4. The method of claim 3 wherein the fluid is a liquid beverage concentrate.

5. The method of claim 3 wherein the flexible container is a bag-in-a-box container.

6. The method of claim 3 wherein the agent is a solvent.

7. The method of claim 3 wherein the agent is water.

8. The method of claim 3 wherein the pressure differential is applied by injecting a gas, compatible with the fluid, into the collapsed flexible container.

9. The method of claim 8 wherein the gas is $CO_2$.

10. The method of claim 8 wherein the gas is air.

11. The method of claim 8 wherein the gas is nitrogen.

12. The method of claim 3 where a wand is inserted into a spout of the collapsed flexible container at the upper end of the collapsed flexible container to thereby position the distal end adjacent the bottom of the collapsed flexible container.

13. The method of claim 12 where the agent is sprayed through a manifold in the wand.

14. The method of claim 12 wherein the suction force is applied through a conduit in the wand.

15. The method of claim 12 wherein the pressure differential and agent are applied to the interior of the container through the same conduit.

16. The method of claim 12 wherein the pressure differential and agent are applied to the interior of the container through different conduits.

17. The method of claim 12 wherein the pressure differential and agent are applied to the interior of the container through concentric conduits.

18. The method of claim 3 wherein:

the step (c) applying a suction force is accomplished by operatively connecting a suction conduit first end with a vacuum source;

the step (b) spraying is accomplished by operatively connecting said first end through a rinse manifold to a cleaning agent source, said manifold having multiple openings; and the step (a) applying a differential pressure is accomplished by operatively connecting said first end through a gas connector to a positive pressure source.

19. The method of claim 3 wherein the fluid is an acidic material.

20. A method of cleaning a collapsed bag of a bag-in-a-box container, comprising the steps of:

(a) inserting a wand through a spout of the collapsed bag at the upper end of the collapsed bag to position the distal end of the wand adjacent the bottom of the collapsed bag;

(b) injecting a gas into the collapsed bag through a conduit in the wand to inflate the bag;

(c) spraying a rinse agent through a conduit in the wand onto the interior surface of the inflated bag to rinse the interior surface of the inflated bag;

(d) withdrawing the mixture of the contents and the rinse agent from the inflated bag through a conduit in the wand to provide a clean, collapsed bag in a bag-in-a-box container.

21. A method of removing fluid from a collapsed flexible container, comprising the steps of:

(a) applying a pressure differential between the exterior and the interior of the flexible container to sufficiently expose the interior surface of the flexible container, (b) spraying a cleaning agent onto the interior surface to sufficiently rinse the fluid from the interior surface, and (c) applying the suction force to substantially withdraw the fluid from the flexible container.

22. The method of claim 21 wherein the fluid is acidic.

23. A wand for withdrawing a fluid from a flexible container comprising:

(a) a suction conduit with a connection to a vacuum pressure source at one end and with an opening at the other end;

(b) a rinse manifold with a connection to a cleaning agent source at said one end and with multiple openings along the length of the manifold; and (c) a gas connector forming a passageway alone said manifold with a connection to a positive pressure source at said one end and with an opening at said other end.

24. The wand of claim 23 wherein said suction conduit, said rinse manifold and the passageway formed by said gas connector are concentrically positioned within the wand.

25. A wand for withdrawing a fluid from a flexible container comprising:

(a) a suction conduit with a connection to a vacuum pressure source at an outlet and with a normally closed valve at an inlet in which said valve is urged open when a vacuum is present at the vacuum pressure source; and (b) a fluid manifold with a selective connection at one end to (i) a cleaning agent source, or (ii) a positive pressure source, and with multiple openings along the length of the manifold.

26. The wand of claim 25 where said suction conduit and said fluid manifold are concentrically positioned within the wand.

27. A wand for withdrawing a fluid from a flexible container comprising:

(a) a suction conduit with a connection to a vacuum pressure source at an outlet and with a normally closed valve at an inlet in which said valve is urged open when a vacuum is present at the vacuum pressure source; and (b) a rinse manifold with a connection to a cleaning agent source at said one end and with multiple openings along the length of the manifold; and (c) a gas connector with a connection to a positive pressure source at said one end and with an opening at said other end.

* * * * *